Nov. 29, 1966    J. I. MASTERS ETAL    3,289,101
LASER SYSTEM WITH OPTICAL COHERENCE COUPLING MEANS
Original Filed Dec. 18, 1961    3 Sheets-Sheet 1

INVENTORS
JOSEPH I. MASTERS
GEORGE B. PARRENT, JR.
BY
ATTORNEY

INVENTORS
JOSEPH I. MASTERS
GEORGE B. PARRENT JR.
BY
ATTORNEY

3,289,101
LASER SYSTEM WITH OPTICAL COHERENCE COUPLING MEANS
Joseph I. Masters, Lexington, and George B. Parrent, Jr., Carlisle, Mass., assignors to Technical Operations, Incorporated, Burlington, Mass., a corporation of Delaware
Continuation of application Ser. No. 159,876, Dec. 18, 1961. This application Apr. 15, 1965, Ser. No. 450,245
17 Claims. (Cl. 331—94.5)

This invention relates to lasers, sometimes called "optical masers," and more particularly to systems for optically coupling two or more independent lasers. This application is a continuation of our application Serial No. 159,876 filed December 18, 1961, now abandoned.

A description of the laser, and its development from the microwave maser, is set forth in an article by Schawlow entitled "Optical Masers," Scientific American, Volume 204, No. 6 (June 1962), pages 52–61. As Schawlow points out, stimulated emission, which is the basis of maser operation, is the reverse of the process in which electromagnetic waves, or photons, are absorbed by atomic systems. When a photon is absorbed by an atom, the atom is raised to an "excited" quantum state by the absorbed energy. Later it may radiate this energy spontaneously, emitting a photon and reverting to the "ground" state or to some intermediate state. During the period in which the atom is excited it can be stimulated to emit a photon if it is struck by an outside photon having precisely the energy of the one that would otherwise be emitted spontaneously. As a result the incoming photon, or wave, is augmented coherently by the one given up by the excited atom.

Like the maser, the laser employs an "active medium" containing atoms which can be placed in an excited state, so that an electromagnetic wave (photon) of the right frequently passing through them will stimulate a cascade of photons. There must be an excess of excited atoms to enable stimulated emission to predominate over absorption. Atoms may be raised to an excited state by injecting into the system (i.e., the active medium) electromagnetic wave energy at a wavelength different from the stimulating wavelength; the activating process is called "pumping."

Unlike the maser, which is contained in a box or cavity having the dimensions of a few wavelengths, the laser is contained in a Fabry-Perot type enclosure in which the distance between the two reflectors is many wavelengths, typically at the present time several thousands of times greater than the emission wavelength. This is an important difference.

In the maser, the cavity can be tuned, for all practical purposes, to a single frequency, and the radiation can be emitted through an aperture which also has dimensions on the order of a wavelength. The maser thus behaves as a point source of radiation and, since the line width is very narrow, the emitted radiation is necessarily coherent. In the laser, on the other hand, the Fabry-Perot type enclosure, which contains the active medium, is not a tuned cavity in the usual sense. At the present time, a laser is typically thousands of wavelengths in cross-section and even greater in length. Since the pupil through which the light is removed is on the order of $10^3 \lambda$ across, the emitted light need not be coherent even though the line width is narrow.

The laser as currently known to the art thus employs a special kind of resonator with dimensions several thousands of times greater than the emission wavelength but which nevertheless favors a particular mode of oscillation. Wave energy propagates in a path between the two reflectors, or mirrors. A wave that starts out near one mirror and travels along the axis between the two mirrors grows by stimulated emission until it reaches the other mirror, where it is reflected into the active medium so that growth can continue. The gain on repeated passages makes up for losses, and an oscillation is built up. Waves starting out inclined at an angle to this axis leave the active medium, either without striking the mirrors or after a few passes; the maximum opportunity to build up exists in favor of waves which start out parallel or closely parallel to the axis. If one of the mirrors is partially transparent, or if a slit is provided through it, a portion of the wave can escape through it.

A contributing factor in the degradation of the coherence of a laser oscillation is the presence of uncorrelated flux in the active medium due to spontaneous emission. The reduction of spontaneous emission during oscillation depends upon the saturating properties and degree of radial taper of the intensity distribution of the internal oscillation. As the laser is now understood by workers in the art, it appears that the preclusion of spontaneous emission by mode propagation of sufficient intensity may be confined to the axial region of the laser body between the end mirrors (e.g., the axial region of a rod-shaped laser). Thus the remainder of the active medium volume can produce a significant amount of spontaneous emission, the flux of which will fill the entire volume of a laser rod or other laser body.

Another factor which tends to reduce the degree of coherence of laser oscillation, and to alter the desired mode of operation, is that due to the scattering and/or the internal reflection of light due to off-axis photons from the lateral boundary surfaces of the laser body. Where, as is often the case, the laser body is cylindrical, these lateral boundary surfaces are long curved surfaces. The return to the laser body of such photons, which may be termed "diffraction loss" photons, which are in themselves capable of regeneration by stimulated emission, further decreases the coherence of radiation.

The reflecting ends of the laser body may also contribute, in some degree, amplitude and phase perturbation of the oscillation wave. This is understandable upon consideration of the demands placed upon the reflecting ends. Since, for sufficient optical feedback to maintain oscillation, only about 1% of the incident beam is transmitted through a partially-reflecting end reflector, less than a 0.1% variation in reflection coefficient over the end face must exist to insure even a 10% uniformity in the amplitude and phase of the transmitted beam. This is true whether the mirror is in the form of a silvered end or a dielectric multi-layer reflection coating.

Thus, in any laser according to the presently-known art, independent of the laser material and the pumping geometry, the emitted beam can be expected to be, at most, partially coherent and to have a nonuniform amplitude and phase distribution across the emitting aperture. It is thus seen that the laser has important differences in inherent properties from the maser.

A laser of cylindrical form can nevertheless achieve a considerable degree of phase coherence in the wave front across the cylinder, and hence across the exit pupil, such that interference bands will be produced on a distant screen in the path of the laser beam when a mask having two slits in it is fitted over the exit pupil. This arrangement produces two-slit interference fringes (of the type obtained in Young's classic two-slit experiment) and thus demonstrates that the laser output wavefront has appreciable coherence. Here the term "coherence" is used in the strict sense of modern optics (see for example Born and Wolf, "Principles of Optics," Chap. 10, Pergammon Press, New York, N.Y., 1959). This is discussed at length in a communication dated November 13, 1961, in Proceedings I.R.E., by the present inventors, in connection with a cylindrical ruby laser.

It is an object of the present invention to couple together two or more independent lasers so that they will oscillate in phase with each other. Another object of the invention is to increase the power density of the output of laser systems by coupling a plurality of lasers to oscillate in phase in a single system. A further object is to provide a laser system having increased directivity and controllable shape of the output light beam, to provide, for example, fan beams, pencil beams, high side lobes, low side lobes, and the like, analogous to the developments of microwave antennas. From another viewpoint, the invention has as an important object to provide methods and means to couple a plurality of independent lasers in an antenna array. A further object is to enhance the pump efficiency in laser systems.

It is a general object of the invention to provide new methods and means for coupling energy into a laser oscillator. Another important object is to provide new methods and means of phase-locking two or more independent lasers.

According to one aspect of the invention, there is provided a coupled laser system comprising a plurality of units of an active medium containing atoms having the property that, when they are struck by stimulating photons, they emit a cascade of coherent photons, each unit having first and second ends defining a path within the unit along which a collection of such photons can build up into a wave directed along said path, said path being several wavelengths long relative to said wave, and coupling means including a medium adapted to propagate said waves optically coupled between said first ends for propagating said waves between said units, said coupling means providing a radiation path between any pair of said first ends which is adapted to maintain coherence between all of said waves.

According to another aspect of the invention, there is provided a coupled laser system comprising an array of at least two units of an active medium containing atoms which are adapted, when struck by stimulating photons, to emit a cascade of coherent photons, each unit having an elongated body having first and second ends defining an axial path within the unit along which a collection of such photons can build up into a wave directed along said path, said path being several wavelengths long relative to said wave, said units being arrayed side by side with their axes parallel to each other and presenting their second ends in common in one direction and their first ends in common in the opposite direction, coupling means including a medium adapted to propagate said waves optically coupled between said first ends for propagating said waves between said units, said coupling means providing radiation paths which are adapted to maintain coherence between all of said waves, and means at each of said second ends for reflecting back into the body having said second end a part, but not all, of the photons incident at said second end.

The foregoing and addtional objects and features of the invention will become apparent from the following description of certain exemplary embodiments. This description refers to the accompanying drawings, wherein.

Figure 1:
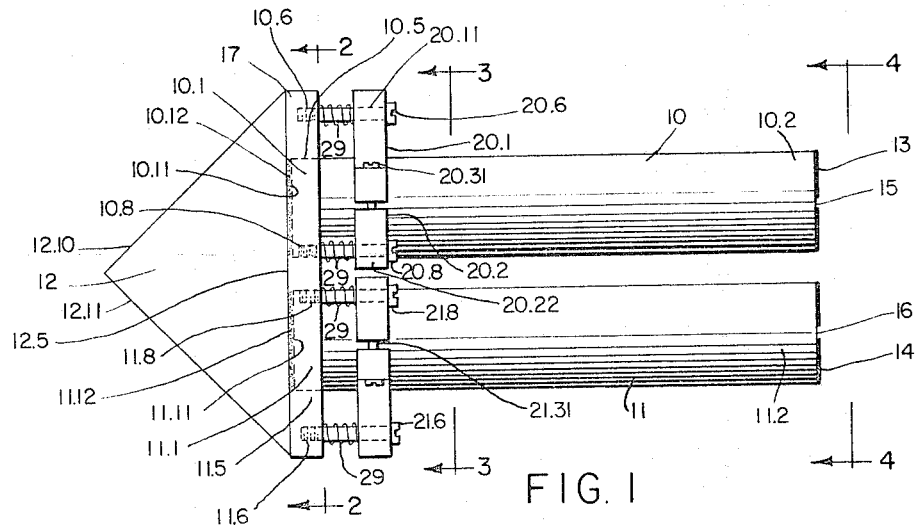
FIG. 1 is a side view of an arrangement for coupling two independent lasers with a right-angle prism.
Figure 2:
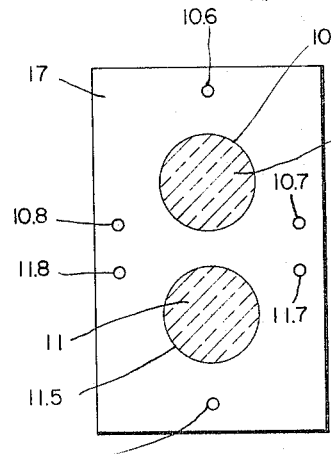
FIG. 2 is a section along line 2—2 of FIG. 1.
Figure 3:
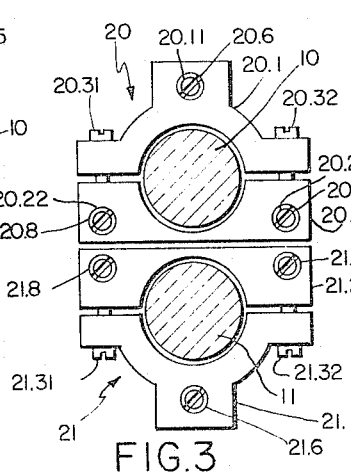
FIG. 3 is a section along line 3—3 of FIG. 1.
Figure 4:
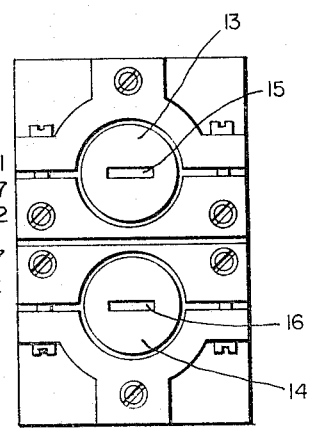
FIG. 4 is an end-view of FIG. 1 taken along line 4—4.
Figure 11:
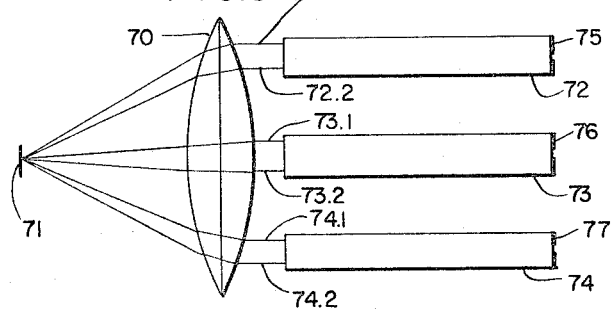
Figure 12:
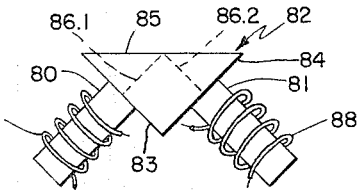
Figure 13:
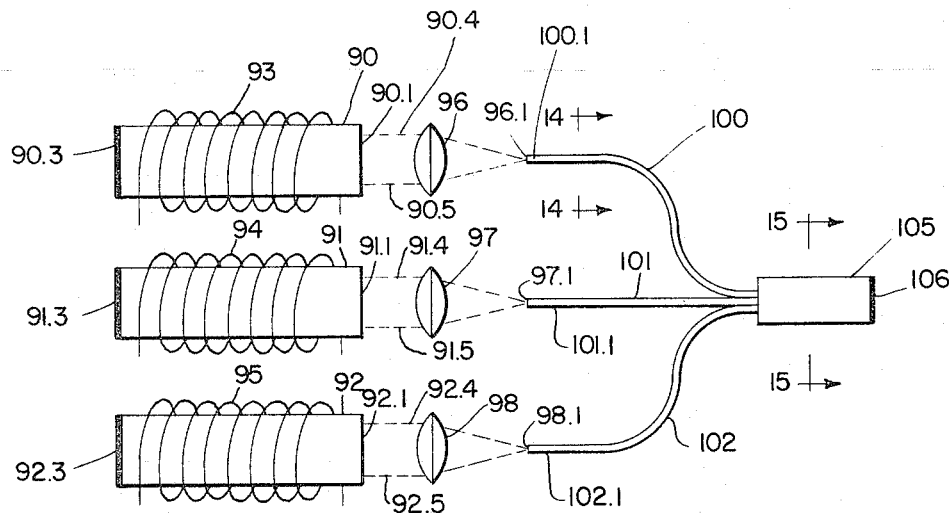
Figures 14, 15:
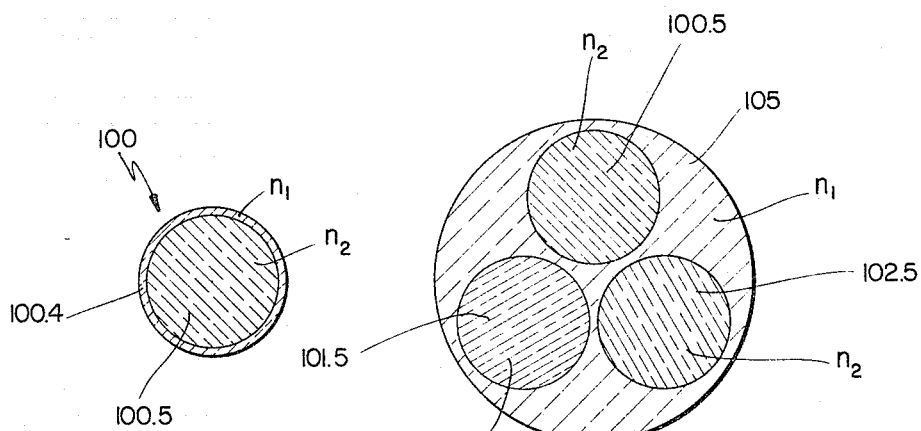

FIG. 11 schematically shows another embodiment of the invention employing a lens as a laser coupling means;

FIG. 12 schematically shows a modification of FIG. 1;

FIG. 13 shows another embodiment of the invention employing fiber optical coupling means;

FIG. 14 is an enlarged section of an optic fiber taken along line 14—14 in FIG. 13; and FIG. 15 is an enlarged section taken along line 15—15 in FIG. 13.

In the descriptions to follow of the illustrated embodiments of the invention, the independent lasers will be described with reference to a solid crystal active medium, such as ruby, it being understood, however, that this is for convenience only and that the invention is applicable to all forms of independent lasers, including, without limitation, the presently-known crystal and gas lasers, some of which are mentioned, and some illustrated, in the above-referenced article by Schawlow, as well as liquid lasers, should they ever be realized.

Referring to FIGS. 1–4, first and second cylindrical laser rods 10 and 11, which may, for example, be ruby lasesrs, have the surfaces 10.11 and 11.11 at their respective first ends 10.1 and 11.1 confronting a common surface 12.5 of a right-angle prism 12, and their respective second ends 10.2 and 11.2 provided with reflectors 13 and 14 which may be totally or partially reflective. Each first end surface may be totally or partially light transmissive, as will be explained more fully below. Each second end reflector has a slit 15 and 16, respectively, in it. A solid block 17, which may be metal, is attached, as with a suitable cement (not shown), to the common surface 12.5 of the prism, to provide a base for mounting the laser rods 10 and 11 with respect to the prism. The base block 17 has first and second bores 10.5 and 11.5 through it, and the first ends 10.1 and 11.1 of the laser rods respectively pass through these bores. Three threaded holes 10.6, 10.7 and 10.8 in the base block surround the first bore 10.5 in a triangular array, and three similar holes 11.6, 11.7 and 11.8 in the base block surround the second bore 11.5 in a similar array.

A first mounting collar 20, made in two parts 20.1 and 20.2, is clamped around the first laser rod 10 a short distance from its first end 10.1, and a second mounting collar 21, made in two parts 21.1 and 21.2, is clamped around the second laser rod 11 a similar distance from its first end 11.1. A pair of bolts 20.31 and 20.32 hold the parts 20.1 and 20.2 of the first mounting collar together and serve to apply force to hold the first laser rod firmly clamped in position between them. Another pair of bolts 21.31 and 21.32 are similarly employed in the second mounting collar 21. In the first mounting collar, a first bore 20.11 is provided in the first part 20.1 for the passage of a first mounting bolt 20.6, and second and third bores 20.21 and 20.22 are provided in the second part 20.2 for the passage of second and third mounting bolts 20.7 and 20.8, respectively. These mounting collar bores are laid out in a triangular array corresponding to the array of the threaded holes 10.6, 10.7 and 10.8 in the base block 17 surrounding the first bore 10.5 therein, and the bolts 20.6, 20.7 and 20.8 are threadedly engaged, respectively, in these threaded holes, and hold the first mounting collar 20 with respect to the base block 17. A second similar arrangement of mounting bolts 21.6, 21.7 and 21.8 is employed in a similar fashion to engage the threaded holes 11.6, 11.7 and 11.8, respectively, surrounding the second bore 11.5 in the base block 17 and hold the second mounting collar 21 with respect to the base block. A spreader spring 29 (see FIG. 1) surrounds the portion of each mounting bolt 20.6, 20.7, 20.8, 21.6, 21.7, and 21.8 between the base block 17 and the respective mounting collar 20 or 21 supported thereby. The spreader springs 29 urge the mounting collars 20 and 21 away from the base block 17. By turning the mounting bolts one way or the other (clockwise or counter-clockwise) the distance between each mounting collar and the base block, and the parallelism between them, can be adjusted.

The mounting collar adjustable support mechanism just described serves to adjust each laser rod 10 and 11 for parallelism between the respective first end surface 10.11 or 11.11 at their first ends 10.1 and 11.1, and the common surface 12.5 of the prism 12. As has been mentioned, the first end surfaces may be totally or partially transparent to light. When they are totally transparent, the first end surfaces are not silvered; that is, one mirror of the Fabry-Perot type enclosure which is customarily used in lasers, as presently known to the art, is omitted. Alternatively, the first end surfaces may have partial reflectors (not shown) if desired. Totally-reflecting mirrors should not be used at the first end surfaces 10.11 and 11.11 for to do so would prevent coupling between the two laser rods 10 and 11. If the common surface 12.5 of the prism is optically flat and the first end surfaces 10.11 and 11.11 of the respective laser rods 10 and 11 are likewise optically flat, parallelism between each first end surface and the common surface of the prism is determined by the observation of interference fringes resulting from multiple reflection from the confronting surfaces 10.11 or 11.11, respectively, and 12.5. If the first end surfaces 10.11 and 11.11 are perpendicular to their respective laser rod axes, then this test also serves to insure perpendicularity of the laser rods 10 and 11 relative to the common surface 12.5 of the prism and hence the parallelism of said rods. The optical mismatch at the ruby-air-glass boundary existing between each laser rod and the prism is reduced in the present embodiment by replacing the air layer with a refractory (i.e., high temperature) liquid 10.12 and 11.12 (e.g., "Dowtherm A"—a trademarked product of the Dow Chemical Company, Midland, Michigan, described by that company as a eutectic mixture containing 26.5% diphenyl and 73.5% diphenyl oxide by weight) having an index of refraction intermediate to the indices of refraction of the laser ruby and the prism glass, respectively.

Figure 5:
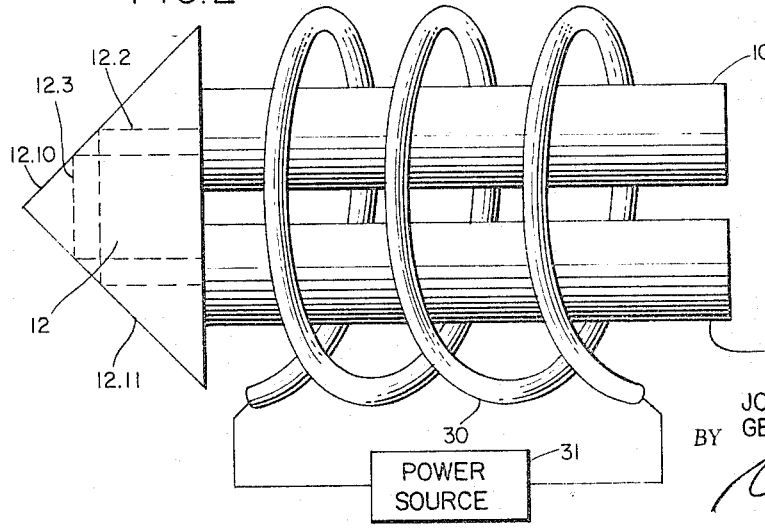
FIG. 5 shows an arrangement for pumping the embodiment of FIG. 1.

The laser rods may have dimensions of ¼" diameter and 1½" length, and may be spaced about 1½ diameters apart on centers in the arrangement shown in FIG. 1. Such an arrangement may fit conveniently into a known type of helical xenon flash lamp 30, as is illustrated in FIG. 5, for pumping both laser rods 10 and 11 simultaneously but independently. The flash tube arrangement is similar to that shown in the above-referenced article by Schawlow, page 58, and includes a power source 31 which may be of any suitable form; it is usual at the present time to flash the tube 30 with a condenser (not shown) included in the power source—as Schawlow indicates. An opaque medium (not shown) may be placed between the two rods 10 and 11, if desired.

Figure 6:
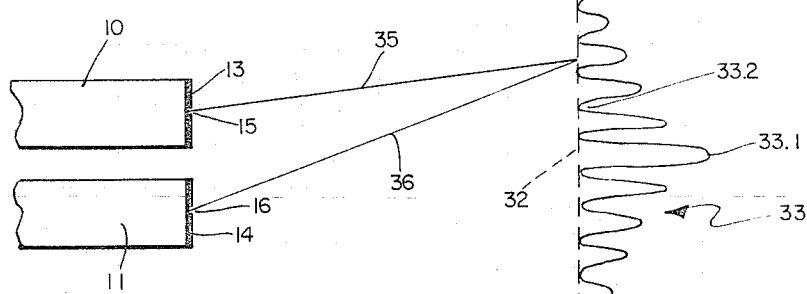
FIG. 6 illustrates the production of an interference pattern by the embodiment of FIG. 1 according to a two-slit interference experiment.

The prism 12 may be a total-internal-reflecting prism having two reflecting walls 12.10 and 12.11 disposed at a right-angle to each other. As has been mentioned, the first end surfaces 10.11 and 11.11 of the laser rods may be either partially or totally transparent and the second ends are provided with reflectors 13 and 14 which are similar to each other, and may be either totally or partially reflecting. With slits 15 and 16 having dimensions 0.005" x 0.125" at the center of each rod second end surface, upon pumping the coupled arrangement of the two lasers 10 and 11 with a xenon flash tube as shown in FIG. 5, both laser rods 10 and 11 emitted laser oscillator light from the slits and interference fringes appeared in the far field, as is illustrated in FIG. 6, where the far field is represented by a dashed line 32 and the emitted light from the slits 15 and 16 is represented by lines 35 and 36, respectively. If totally reflecting mirrors are used at the first end surfaces 10.11 and 11.11, the laser oscillation light outputs from the slits 15 and 16 will not interfere.

The interference fringes are represented by the solid line 33 indicating a series of peaks 33.1 and troughs 33.2. The peaks represent density of reinforcing waves from the apertures 15 and 16 as detected by far field microphotographic measurement. The peak density was well above fog level for the film used in this measurement and the spacing between fringes was about $10^{-4}$ radians, which is correct for the spacing between the slits, which was about $10^4\lambda$. The fringes appeared to be $\cos^2(\pi d \sin\theta/\lambda)$ modulation of the maxima in the diffraction pattern obtained when one slit is covered during oscillation of the coupled two laser system, where:

$\lambda$=wavelength of radiator
$d$=distance between slit centers
$\theta$=angular space between fringes Except for a factor of 3 reduction in fringe spacing, the overall interference pattern is similar to that reported by the present inventors, as mentioned above, for narrow slits separated by approximately $3\times10^3\lambda$ at the end of a single ruby laser rod. The light emitted through the slits 15 and 16 of the two independent lasers 10 and 11 coupled according to the present invention is thus seen to be coherent, and the two independently pumped laser rods 10 and 11 are coupled coherently or phase-locked, by the present invention.

The coupled laser system of the invention has additional unique and advantageous properties which are not immediately apparent from the successful performance of a two-slit interference experiment as shown in FIG. 6. At first glance this system appears, except for an intermediate optical path in the coupling prism 12, to be the equivalent of a single laser rod having a length approximately double that of either of the independent laser rods 10 and 11, and this is apparently correct insofar as it concerns the oscillating beam component of the photon cascade. However, the total-internal-reflecting prism 12 twice reflects the beam from each laser 10 or 11, there being one rectangular reflection from each reflecting surface 12.10 and 12.11. The total reflection property of the prism couples radiation having a direction falling within a small axial conoid section, and fails to couple (or rejects) off-axis radiation by transmission out of the prism or by loss due to beam divergence within the prism path, as can be appreciated upon observation of the pair of dotted lines 12.2 and 12.3 outlining the path of coupled radiation in the prism, in FIG. 5. This directional selectivity increases as the index of refraction of the prism approaches $\sqrt{2}$. This unique property of directional selectivity in the coupling mechanism in coupled laser systems of the present invention reduces and to some extent decouples from the system the uncorrelated component of the internal radiation flux in each of the laser rods 10 and 11.

Figure 8:
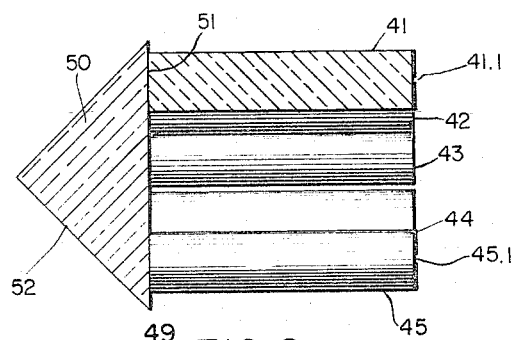
FIG. 8 is a side-section taken along line 8—8 of FIG. 7.
Figure 7:
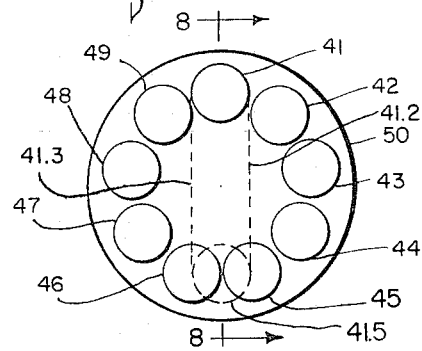
FIG. 7 is an end-view of an embodiment of the invention employing a conical prism to couple an array of independent lasers.
Figure 9:
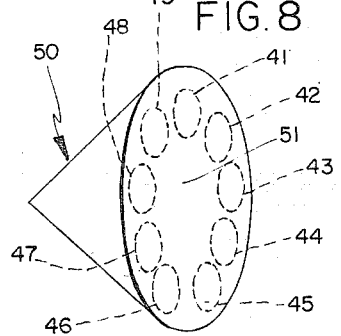
FIG. 9 is an isometric view of the coupling prism of FIG. 7.

FIGS. 7, 8 and 9 illustrate a system of nine independent laser rods 41, 42, 43, 44, 45, 46, 47, 48 and 49 in a circular array, all coupled by a single conical prism 50. The rods are arranged with their axes parallel to each other, their first ends all coupled in common to the flat surface 51 of the prism and their second ends extending in the same direction away from the prism. As in the embodiment of FIG. 1, the first end surfaces may be totally or partially transparent to light. By adjusting the degree of transparency, we adjust the degree of coupling between each laser rod and the prism—this adjustment may be termed "variable coupling." We have achieved variable coupling in some cases by making holes in a reflector to effect partial transparency. The laser rods are all pumped together, but independently, as in FIG. 5. Their second ends may be fitted with suitable reflectors, which may be totally or partially reflective and have apertures, as shown at 41.1 and 45.1, for example, at the free or second ends of two of the rods 41 and 45, respectively; the apertures may have any shape; the particular shape is determined by the form of the desired diffraction pattern. All of the laser rods will oscillate in a mutually coherent mode when pumped, due to the coupling action of the conical prism 50, the outer conical surface 52 of which acts as a reflector, and a multiple-aperture laser antenna is thus provided. Each laser rod will couple with at least two other laser rods, as is indicated by dotted lines 41.3 and 41.2 representing the path of the wave from one rod 41 across the prism to the opposite side. This wave appears in the dotted-line circle 41.5, which overlaps two rods 45 and 46, thereby coupling with both. With this arrangement, one may provide a light radiation diffraction pattern of a desired shape and can increase the power density in a desired direction; that is, one can achieve an optical antenna array.

In addition to the above-described property of the laser coupling systems of the present invention according to which uncorrelated flux in the individual laser rods is reduced and decoupled from the system, systems using two or more laser units according to the invention have a further advantage over a single laser unit providing the same number of exit apertures, as follows. In order to provide the same array of exit apertures, for example, in a nine-laser array as in FIG. 7, a single laser unit would have a cross-sectional diameter D equal to the cross-sectional diameter of the nine-laser array. Considering the array of laser rods in FIG. 7, it is apparent that the total volume of active laser material in FIG. 7 is smaller than the volume of active laser material which would be present in a single laser unit of diameter D and the same length as the rods in FIG. 7. It is also apparent that the ratio of total volume of active laser material to the total transparent surface of all the rods in FIG. 7 would be smaller than the corresponding volume to surface ratio of such a single laser unit. Now, the uncorrelated flux density appears to increase as the volume-to-transparent-surface-ratio. Thus, a system of the invention, since it decreases the volume-to-surface ratio for a given array of exit apertures, reduces the uncorrelated flux density; that is, the invention provides a noise advantage over a single laser rod having the same exit aperture array. If the diameter of such a single large rod is D, and the diameter of each individual rod shown in FIG. 7 is $d$, the noise advantage of the system of the invention approaches, as an upper bound, the ratio of these diameters $D/d$. This is true also of the two-rod array of FIG. 1, as compared with a single rod having a diameter D equal to the distance between the outer sides of the two rods 10 and 11, and having two apertures like the apertures 15 and 16.

Figure 10:
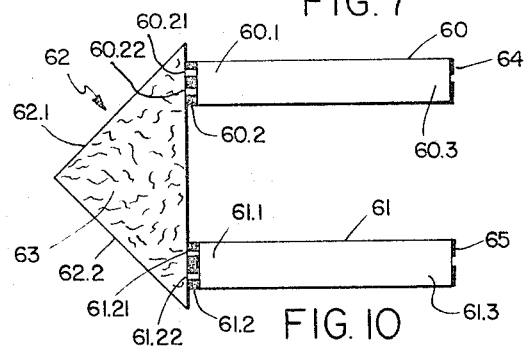
FIG. 10 shows another embodiment of the invention employing a scattering coupling medium.

In FIG. 10 two laser rods 60 and 61 are coupled together coherently by a prism-shaped body 62 made of a light-scattering medium 63. The light-scattering medium may be any material which scatters light (e.g., opal glass), and is preferably non-absorbing, the laser rods are fitted at their respective first ends 60.1 and 61.1 with reflectors 60.2 and 61.2, each of which has a pair of apertures 60.21, 60.22 and 61.21, 61.22, respectively. The apertures may be slits, or holes. Each aperture pair assures a pair of coherent light beams from each rod and that coherent light arriving at them from the turbulent medium 63 will propagate along the axis of the laser rod receiving the light. Off-axis light passing out of a laser rod through an aperture pair will be rejected by the coupling system. The outer surfaces 62.1 and 62.2 of the coupling body 62 are reflective. The outer or free ends 60.3 and 61.3, respectively, of the laser rods 60 and 61 are provided with apertured reflectors 64 and 65, respectively.

FIG. 11 shows schematically another coupling system employing a lens 70 and a mirror 71 at its focus. The mirror 71 may be of any suitable form, curved or plane; it may be a diffuse reflector. Three laser rods 72, 73 and 74 are shown arrayed side-by-side with their axes parallel; these represent any desired array of laser rods to be coupled or phase-locked together by the lens-mirror optical coupling mechanism. The laser oscillation beam associated with each laser rod is represented by a pair of parallel ray lines: 72.1, 72.2; 73.1, 73.2; and 74.1, 74.2; respectively. Employing these pairs of ray lines according to the usual rules of geometric optics, it is seen that they all converge on the mirror 71, at the focus of the lens 70. They are also reflected back through the lens to the laser rods. As in the case of the coupling mechanism employing a right-angle prism in FIG. 1, or a conical prism in FIGS. 7–9, inclusive, upon pumping all the laser rods simultaneously, this coupling mechanism will phase-lock all of the independent laser elements 72, 73 and 74 together. The ends of the laser rods confronting the lens 70 may be totally or partially transparent, while the outer ends directed away from the lens have reflectors 75, 76 and 77, which may be partially or totally reflective, and may be apertured, as in FIG. 1.

FIG. 12 shows a variation of the embodiment of FIG. 1 in which first and second laser rods 80 and 81 are optically coupled to a right-angle prism 82 at the rectangularly-related surfaces 83 and 84, respectively, and the longer or base, surface 85 is employed to effect one right-angled change in direction of the laser beam, as indicated by the dashed lines 86.1 and 86.2. Because the laser rods in this embodiment of the invention are disposed at right angles to each other, it will be convenient to employ separate flash lamps 87 and 88, one with each laser rod 80 and 81, respectively, for pumping the laser rods. These flash lamps may be fired simultaneously as from a common power source (not shown).

FIGS. 13–15, inclusive, show three laser rods 90, 91 and 92 provided with separate flash lamps 93, 94 and 95, respectively. The first ends 90.1, 91.1 and 92.1, respectively, of the laser rods each confront a converging lens 96, 97 and 98, respectively, preferably having an aperture of $f/1$. The laser oscillation wave associated with each laser rod is represented by a pair of parallel dashed ray lines: 90.4, 90.5; 91.4, 91.5; and 92.4, 92.5, respectively. Each such wave emitted from the first ends of the laser rods is converged at the focus 96.1, 97.1, or 98.1, respectively, of the lens through which it passes. Three fiber optic light conductors 100, 101 and 102 are located so that each has an end 100.1, 101.1, 102.1 at one of the respective foci 96.1, 97.1 and 98.1. As will be discussed more fully below, the core of each light conductor has a diameter of about one wavelength of the laser oscillation wave. Thus if each lens has an aperture equal to or greater than the associated laser aperture at the first surface of the laser, and a focal length equal to or less than this aperture, the spot size of the light focused at the focal point will also be about one wavelength, and all of the light will enter the associated fiber optic light conductor. Hence, we prefer to employ lenses having an aperture of $f/1$.

The fiber optic light conductors are of a form which is known to the art of fiber optics (see "Scientific American," November 1960; pages 72–75). Each conductor, as exemplified by the first conductor 100 and shown in FIG. 14, has a core 100.5, which is a cylindrical fiber of glass with a high index of refraction, $n_2$, surrounded by a thin cladding or coating 100.4 of glass with a low index of refraction, $n_1$. All three conductors are brought together in a common cladding 105 at their ends remote from the lenses. FIG. 15 shows the cores 100.5, 101.5 and 102.5 in the common cladding 105. The common cladding 105 may have the same index of refraction $n_1$ as the individual fiber claddings. A reflector 106 terminates the common ends of the fibers.

It is known in the art of fiber optics that light can escape from one fiber core to an adjacent core through a common cladding. This phenomenon is referred to in the art as "cross-talk." Thus light which is introduced into each optic fiber from the respective lasers may be interchanged among the cores through cross talk in the common cladding 105, then reflected by the reflector 106 back to the free ends 100.1, 101.1 and 102.1.

We prefer to use optical fibers in which the diameter of the core is not greater than 1 micron, which is of the order of one wavelength of the laser oscillation wave. Then each free end 100.1, 101.1 and 102.1 functions as a point source of emitted light located at the focus of a converging lens, and this gives rise to plane waves incident upon the first ends 90.1, 91.1 and 92.1 of the respective laser rods from the fiber optic light conductors.

The ends of the laser rods in the embodiment of FIG. 13 may be treated in the same manner as in FIG. 1, FIG. 8 or in FIG. 11, for example. Thus the ends remote from the lenses may have suitable reflectors 90.3, 91.3 and 92.3, respectively, which may be totally or partially reflective, and which may have apertures (not shown). The first ends 90.1, 91.1 and 92.1, respectively may have surfaces which are totally or partially transparent to light; variable coupling, as described above in connection with the embodiment of FIGS. 7, 8 and 9, may be employed between each rod and the fiber optic conductor associated with it. Each rod is coupled with the other two rods through cross-talk in the fiber optic system. Obviously, the system shown in FIG. 13 is not limited to three laser rods; any desired number of rods may be employed, and they may be arrayed as desired. Through individual flash lamps 93, 94 and 95, respectively, they may be independently pumped; these lamps may be flashed simultaneously. A single flash lamp may be used with an appropriate array, as shown for example in FIG. 5.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. For example, the invention is not limited to any particular form of pumping. While one well-known form of pumping has been illustrated, for convenience, it is contemplated that other forms, such as an electrical discharge in a gas laser, or a beam of light, may be used, where appropriate or desirable. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Coupled laser system comprising, at least first and second units of an active medium containing atoms having the property that, when they are struck by a stimulating photon, they emit a cascade of coherent photons, each unit having first and second ends and respective wave reflector means associated one with each of said second ends defining ends of paths transversing each unit along which a collection of such photons can build up into a wave directed along said path, each of said paths being several wavelengths long relative to said wave, said first ends having substantially total transparency to said wave, coupling means including a medium adapted to propogate said waves optically coupled between said first ends for propagating said waves between said units, said coupling means providing a least one radiation path which is adapted to maintain coherence between all of said waves propagating therethrough between any pair of said reflector means associated with said second ends, and means to adjust the degree of optical coupling between each of said first ends and said coupling means, the reflector means associated with at least two of said second ends being adapted to transmit a portion and reflect the remainder of said wave.

2. Coupled laser system comprising, at least first and second units of an active medium containing atoms having the property that, when they are struck by a stimulating photon, they emit a cascade of coherent photons, each unit having first and second ends, and respective wave reflector means associated one with each of said second ends defining ends of paths traversing each unit along which a collection of such photons can build up into a wave directed along said path, each of said paths being several wavelengths long relative to said wave, and coupling means including a medium adapted to propagate said waves optically coupled between said first ends for propagating said waves between said units, said coupling means providing at least one radiation path between said first ends which is adapted to maintain coherence between all of said waves, said coupling means including at least one reflector of said photons disposed in said coupling path and oriented with respect to said radiation path to effect at least one abrupt change in the direction of said waves in said radiation path, the reflector means associated with at least two of said second ends being adapted to transmit a portion and reflect the remainder of said wave.

3. Coupled laser system comprising, at least first and second units of an active medium containing atoms having the property that, when they are struck by a stimulating photon, they emit a cascade of coherent photons, each unit having first and second ends and respective wave reflector means associated one with each of said second ends defining ends of paths traversing each unit along which a collection of such photons can build up into a wave directed along said path, the distance between said ends of each unit being of the order of thousands of times the length of said wave in said medium, and coupling means including a medium adapted to propagate said waves optically coupled between said first ends for propagating said waves between said units, said coupling means providing at least one radiation path in said propagating medium between said first ends which is of the order of thousands of times the length of said wave whereby said coupling means is adapted to maintain coherence between all of said waves, said coupling means including at least one reflector of said photons disposed in said radiation path and oriented with respect to said radiation path to effect at least one abrupt change in the direction of said waves in said radiation path, and means at each of said second ends to transmit a portion and reflect the remainder of said wave, said units being so oriented relative to each other that said transmitted portions can propagate toward the same region in space.

4. Coupled laser system comprising, an array of at least two units of an active medium containing atoms having the property that, when they are struck by a stimulating photon, they emit a cascade of coherent photons, each unit being an elongated body having first and second ends defining an axial path within the unit along which a collection of such photons can build up into a wave directed along said path, said path being several wavelengths long relative to said wave, said units being arrayed side-by-side with their axes parallel to each other and presenting their second ends in common in one direction and their first ends in common in the opposite direction, coupling means including a medium adapted to propagate said waves optically coupled between said first ends for propagating said waves between said units, said coupling means providing radiation paths which are adapted to maintain coherence between all of said waves, and means at at least two of said second ends for reflecting back into each body having one of said second ends a part, and transmitting a part of the photons incident at said second end.

5. Apparatus for producing coherent radiation comprising a plurality of units of an active medium containing atoms having the property that, when they are struck by a stimulating photon, they emit a cascade of coherent photons; each unit having first and second ends; wave reflector means associated one with each of said second ends defining ends of paths traversing each unit along which a collection of such photons can build up into a wave directed along said paths, each of said paths being several wave lengths long relative to said wave; said first ends having substantially total transparency to said wave, coupling means including a medium adapted to propagate said waves optically coupled between said first ends for propagating said waves between said units, said coupling means providing at least one radiation path between said first ends which is adapted to maintain coherence between all of said waves, propagating therethrough between any pair of said reflector means associated with said second ends; and, at least one of said wave reflector means associated with one of said second ends adapted to transmit a portion of the incident waves as coherent radiation.

6. Apparatus for producing coherent radiation according to claim 5 in which said coupling means is an optical prism coupled to all of said first ends and adapted and disposed to propagate waves between said units, said prism providing an optical path for said waves between any two of said first ends in which there is at least one abrupt change in the direction of propagation of said waves in said radiation path.

7. Apparatus for producing coherent radiation according to claim 5 in which said coupling means includes a light scattering medium having first surface means confronting said first ends and transparent to said waves, and on other surfaces thereof reflectors bounding said light scattering medium located in the wave path for directing said waves between said first ends, and in which said radiation path between said first ends is adapted to maintain coherence between all of said waves by means of masks containing apertures positioned across each of said first ends.

8. Apparatus for producing coherent radiation according to claim 5 in which said coupling means is an optical right-angle prism and including means to support said units disposed spaced apart with said paths parallel to each other and said first ends substantially in a common plane.

9. Apparatus for producing coherent radiation according to claim 5 in which said coupling means comprises a converging lens means disposed confronting but spaced from said first ends with its optic axis between and parallel to said paths and adapted to focus said waves substantially at a point further remote from said first ends; a mirror at said point defining the remaining end of each of said paths; and, said apparatus including means to support said units disposed spaced apart with said paths parallel to each other and said first ends substantially in a common plane.

10. Apparatus for producing coherent radiation according to claim 5 in which said coupling means is a conical optical prism having its base adjacent said first ends and providing a plurality of radiation paths between said first ends.

11. Apparatus for producing coherent radiation according to claim 6 in which said medium adapted to propagate waves includes an optically transparent material having an index of refraction intermediate between the respective indices of said active medium and said prism disposed between each of said first ends and said prism.

12. Apparatus for producing coherent radiation according to claim 5 in which said medium adapted to propagate waves is fiber optic light conductor means.

13. A component part of a laser system comprising an active laser medium, a lens, a first end of said medium confronting said lens, elongated light-conductor means at the remote focus of said lens to conduct light emitted from said medium, a reflector terminating said means to conduct light, and a second end of said medium remote from said lens having a second reflector, said reflectors constituting the principal optical elements defining the ends of a path traversing said active medium along which a collection of coherent photons can build up into a wave directed along said path; said first end having transparency to said wave which is in the range between total transparency and partial transparency.

14. A component part of a laser system comprising an active laser medium, a lens confronting a first end of said medium, a mirror forming a first reflective surface confronting said lens, and the end of said active laser medium remote from said lens having a second reflective surface, said first and second reflective surfaces constituting the principal optical elements defining the ends of a path traversing said active medium along which a collection of coherent photons emitted by said medium can build up into a wave directed along said path; said first end having transparency which is in the range between total transparency and partial transparency.

15. A component part of a laser system comprising an active laser medium, means providing a first reflective surface at one axial end of said medium, an optical prism confronting the second axial end of said medium, and means providing a second reflective surface spaced from said prism, said prism being located to direct light from said active medium to said second reflective surface, one of said surfaces including means to transmit part of the incident light, said first and second reflective surfaces constituting the principal optical elements defining the ends of a path traversing said active medium along which a collection of coherent photons emitted by said medium can build up into a wave directed along said path; said first end having transparency which is in the range between total transparency and partial transparency.

16. A laser system comprising a plurality of units at least one of which is an active medium containing atoms having the property that, when they are struck by stimulating photons they emit a cascade of coherent photons, each unit having first and second ends defining a path along which photons can build up into a wave directed along said path, said path being several wavelengths long relative to said wave, said first ends having substantially total transparency to said wave, coupling means including a medium adapted to propagate said waves optically coupled between said first ends for propagating waves in a path which has a change of direction between said units, and means at each of said second ends for reflecting back into the body having said second end a part of the photons incident at said second end any pair of said reflecting means constituting the principal optical elements defining the ends of a path traversing said units along which a collection of coherent photons can build up into a wave directed along said path.

17. A component of a laser system comprising an active laser medium, a pair of mirrors defining a path through said medium, along which coherent light builds up in multiple passes between said mirrors at least one of said mirrors remote from an end of said medium, and an optical means located between said mirror and said end for effecting a change in the direction of substantially all of the coherent light propagating between said mirrow and said end; said end having transparency to said light which is in the range between total transparency and partial transparency, one of said mirrors adapted to transmit a part of the incident light.

References Cited by the Examiner
UNITED STATES PATENTS

| | | | |
|---|---|---|---|
| 2,929,922 | 3/1960 | Schawlow et al. | 331—94.5 |
| 3,134,837 | 5/1964 | Kisliuk et al. | 331—94.5 |
| 3,136,959 | 6/1964 | Culver | 331—94.5 |

(Other references on following page)

FOREIGN PATENTS 608,711   3/1962   Belgium.

OTHER REFERENCES

Hellwarth, "Control of Fluorescent Pulsations" from Advances in Quantum Electronics, edited by Singer, Columbia University Press, New York, 1961, pp. 334–341.

This reference is from a collection of papers delivered at the Second International Conference on Quantum Electronics held in Berkeley, California, on March 23–25, 1961.

JEWELL H. PEDERSEN, *Primary Examiner.*

J. L. CHASKIN, R. L. WIBERT, *Assistant Examiners.*